March 22, 1960     B. B. FELTS     2,929,263

DEPRESSIBLE STEERING WHEEL FOR AUTOMOTIVE VEHICLES

Original Filed March 24, 1958

INVENTOR.

BASIL B. FELTS

BY Robert C. Comstock

ATTORNEY

United States Patent Office 2,929,263
Patented Mar. 22, 1960

2,929,263

DEPRESSIBLE STEERING WHEEL FOR AUTOMOTIVE VEHICLES

Basil B. Felts, Banning, Calif.

Original application March 24, 1958, Serial No. 723,263, now Patent No. 2,888,836, dated June 2, 1959. Divided and this application March 9, 1959, Serial No. 798,304

7 Claims. (Cl. 74—493)

This invention relates to a depressible steering wheel construction for automotive vehicles. This is a divisional application of my application Serial No. 723,263, filed March 24, 1958, now Patent No. 2,888,836.

It is a well-known fact that large numbers of persons are killed or seriously injured due to impact with the steering wheel and steering assembly of an automotive vehicle upon the occurrence of a collision. It is an object of this invention to provide a depressible steering wheel construction for automotive vehicles which is adapted to automatically yield beneath the impact of the driver's body in the event of a collision. It is a further object of the invention to provide such a structure in which its yieldability does not interfere in any way with the operation and driving control of the steering assembly.

It is another object of the invention to provide a device of the type described which is simple in construction and design, requiring only a limited number of easily manufactured and assembled parts, so that it is capable of widespread use by manufacturers and the general public. It is a related object of the invention to provide such a structure which may be installed as original equipment at the time an automotive vehicle is manufactured or which may be easily, quickly and economically installed on any new automotive vehicle.

It is a further object of the invention to provide such a device in which the steering wheel may be depressed a short distance against a small amount of resistance or a greater distance against increased resistance.

In essence, my invention contemplates a depressible steering wheel assembly in which a plurality of notches or teeth are resiliently engaged in such a manner that the steering wheel may be depressed in a series of steps and in which its continued depression encounters increased resistance from the resilient means employed to resist the downward movement of the wheel.

It is accordingly an object of my invention to provide a steering assembly having all of the features and advantages of the construction set forth.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings, Fig. 1 is a side elevational view mostly in section of my steering wheel construction;

Figure 1:
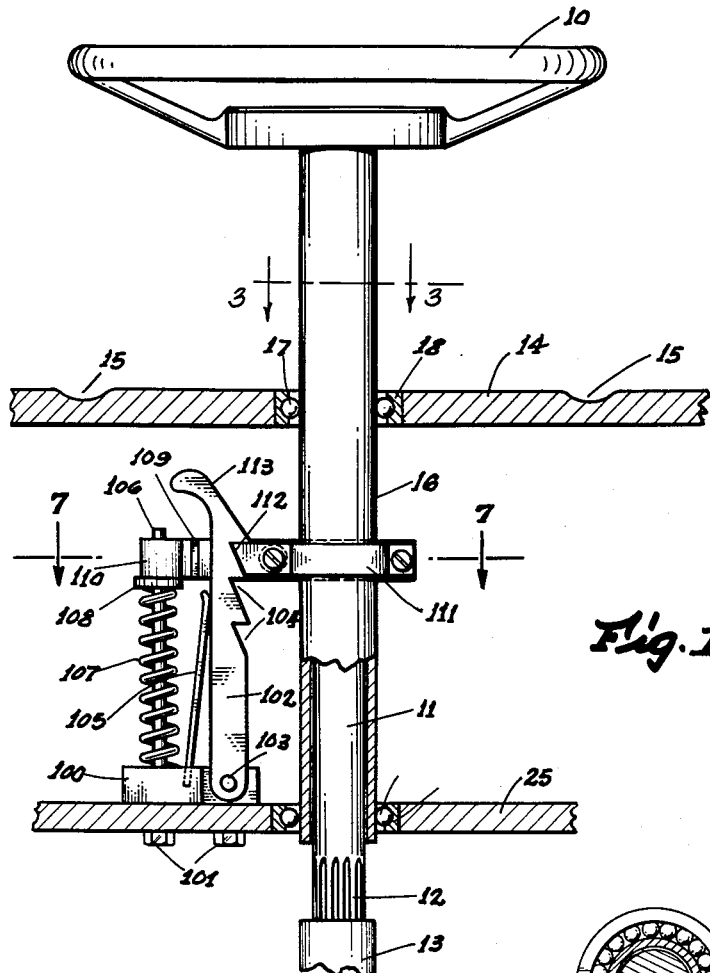
Figure 2:
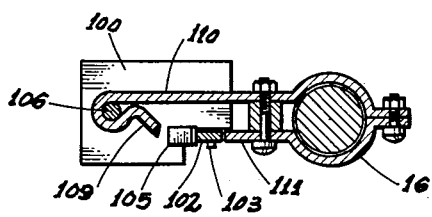
Fig. 2 is a sectional view taken on line 2—2 of Fig. 1.
Figure 3:
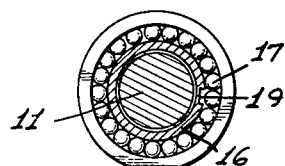
Fig. 3 is a sectional view taken on line 3—3 of Fig. 1.

A preferred embodiment which has been selected to illustrate my invention comprises a steering wheel 10, which is rotatably mounted on the upper end of a steering column 11, the lower end of which carries a plurality of splines 12 which connect it to the receiver 13. The dashboard 14 of the vehicle may be suitably padded and may be provided with depressed areas 15 for receiving the steering wheel when it is depressed.

The steering column 11 is mounted in a steering column housing 16, which passes through an opening in the dashboard 14 and is surrounded by a plurality of ball bearings 17, which are mounted in a race 18. The ball bearings 17 facilitate the downward movement of the steering column housing 16. The steering column housing 16 is provided with an elongated groove 19 into which fits a stationary element which comprises a part of or which is secured to the dashboard, in order to prevent undesirable rotation of the steering column housing 16. Similar ball bearings 17 are provided where the steering column housing 16 passes through the floor 25.

A bracket 100 is secured to the floor 25 by fastening members 101. The lower end of a rack 102 is pivotally secured to the bracket 100 by a fastening member 103. The upper end of the rack 102 is provided with a plurality of spaced notches 104. A leaf spring 105 is secured at its lower end to the bracket 100 and extends upwardly substantially parallel to the rack 102. The upper end of the leaf spring 105 bears against the rack 102 to normally urge it toward the steering column housing 16.

A rod 106 is rigidly secured at its lower end to the bracket 100 and extends upwardly therefrom parallel to the rack 102. A coil spring 107 surrounds the lower part of the rod 106. The upper end of the coil spring 107 bears against a washer 108, which in turn bears against the looped end 109 of a long bar 110, which is secured at its opposite end to the steering column housing 16. A short bar 111 is secured at one end to the steering column housing 16 and its opposite free end 112 engages the notches 104 in rack 102.

In use, the bars 110 and 111 are carried downwardly by the downward movement of the steering column housing 16 against the urging of the coil spring 107. The free end 112 of the short bar 111 moves downwardly along the notches 104.

In order to release the wheel for return to its normal position, the driver engages the upper end 113 of the rack 102 with his foot and moves it away from the steering column housing 16 against the pressure of leaf spring 105 until it engages the looped end 109 of the long bar 110. This releases the end 112 of the short bar 111 from the notches 104 and permits the steering column housing 16 to be returned to its normal position by pressure from the coil spring 107.

I claim:

1. A depressible steering construction for automotive vehicles comprising a steering wheel mounted on the upper end of a rotatable steering column, said steering column being rotatably mounted within a steering column housing, said housing extending through openings in the dashboard and floor of the vehicle, a plurality of ball bearings disposed around each of said openings and engaging said housing to facilitate the longitudinal movement of said housing through said openings, means for preventing the rotatable movement of said housing within said openings, a long bar and a parallel short bar each secured at one end to the portion of said housing between the dashboard and floor of the vehicle, said bars extending substantially transversely with respect to said housing, a vertically extending rack secured at its lower end to the vehicle adjacent the floor, the upper end of said rack having a vertically extending row of adjacent notches formed therein, the free end of said short bar being adapted to engage said notches, a coil spring extending between the outer end of said long bar and the floor of the vehicle, a leaf spring extending substantially parallel to said rack, the lower end of said leaf spring being secured to the vehicle and the upper end thereof engaging the side of said rack remote from said housing so as to urge said rack toward said housing, said housing adapted upon downward movement to carry said long bar downwardly against the resistance of said coil spring, the outer end of said short bar successively engaging the notches in said rack.

2. A depressible steering construction for automotive vehicles comprising a steering wheel mounted on the upper end of a rotatable steering column, said steering column being rotatably mounted within a steering column housing, a bar secured at one end to the portion of said housing between the dashboard and floor of the vehicle, said bar extending substantially transversely with respect to said housing, a vertically extending rack secured at its lower end to the vehicle adjacent the floor, the upper end of said rack having a vertically extending row of adjacent notches formed therein, the free end of said bar being adapted to engage said notches, a leaf spring extending substantially parallel to said rack, the lower end of said leaf spring being secured to the vehicle and the upper end thereof engaging the side of said rack remote from said housing so as to urge said rack toward said housing, said housing adapted upon downward movement to carry said bar downwardly, the outer end of said bar successively engaging the notches in said rack.

3. A depressible steering construction for automotive vehicles comprising a steering wheel mounted on the upper end of a rotatable steering column, said steering column being rotatably mounted within a steering column housing, a bar secured at one end to said housing, said bar extending substantially transversely with respect to said housing, a vertically extending rack pivotally secured at its lower end to the vehicle, the upper end of said rack having a vertically extending row of adjacent notches formed therein, said bar having a free end adapted to engage said notches, a coil spring extending between the outer end of said bar and the floor of the vehicle, said housing adapted upon downward movement to carry said bar downwardly against the resistance of said coil spring, the free end of said bar successively engaging the notches in said rack.

4. A depressible steering construction for automotive vehicles comprising a steering wheel mounted on the upper end of a rotatable steering column, said steering column being rotatably mounted within a steering column housing, a bar secured at one end to said housing, said bar extending substantially transversely with respect to said housing, a vertically extending rack pivotally secured at its lower end to the vehicle, the upper end of said rack having a vertically extending row of adjacent notches formed therein, said bar having a free end adapted to engage said notches, and resilient means adapted to resist the downward movement of said bar, said housing adapted upon downward movement to carry said bar downwardly against the resistance of said resilient means, the free end of said bar successively engaging the notches in said rack.

5. The structure described in claim 4 and resilient means normally urging said rack toward said housing to hold the free end of said bar within said notches.

6. A depressible steering construction for automotive vehicles comprising a steering wheel mounted on the upper end of a rotatable steering column, said steering column being rotatably mounted within a steering column housing, a bar secured to said housing, a pivotally mounted rack disposed adjacent said housing, said rack having a plurality of adjacent notches, said bar having a free end adapted to engage said notches, and resilient means adapted to resist the downward movement of said bar, said housing adapted upon downward movement to carry said bar downwardly against the resistance of said resilient means, the free end of said bar successively engaging the notches in said rack.

7. The structure described in claim 6 and resilient means normally urging said rack toward the free end of said bar to hold the free end of said bar within said notches.

References Cited in the file of this patent
UNITED STATES PATENTS

| | | |
|---|---|---|
| 1,151,405 | Schmidt | Aug. 24, 1915 |
| 1,174,376 | Anderson | Mar. 7, 1916 |
| 1,193,154 | Kirchhoff | Aug. 1, 1916 |
| 2,800,190 | Dvorak | July 23, 1957 |